(12) United States Patent
Badarlis et al.

(10) Patent No.: US 11,971,281 B2
(45) Date of Patent: Apr. 30, 2024

(54) METHOD FOR PRODUCING A PROBE OF A THERMAL FLOWMETER, PROBE OF A THERMAL FLOWMETER, AND THERMAL FLOWMETER

(71) Applicant: Endress+Hauser Flowtec AG, Reinach (CH)

(72) Inventors: Anastasios Badarlis, Birsfelden (CH); Stephan Gaberthüel, Oberwil (CH); Alexander Grün, Lörrach (DE); Hanno Schultheis, Lörrach (DE); Tobias Baur, Reinach (CH); Martin Barth, Riehen (CH); Martin Arnold, Reinach (CH); Mathieu Habert, Rixheim (FR)

(73) Assignee: Endress+Hauser Flowtec AG, Reinach (CH)

( * ) Notice: Subject to any disclaimer, the term of this patent is extended or adjusted under 35 U.S.C. 154(b) by 110 days.

(21) Appl. No.: 17/603,140

(22) PCT Filed: Mar. 31, 2020

(86) PCT No.: PCT/EP2020/059058
§ 371 (c)(1),
(2) Date: Oct. 12, 2021

(87) PCT Pub. No.: WO2020/212130
PCT Pub. Date: Oct. 22, 2020

(65) Prior Publication Data
US 2022/0196450 A1 Jun. 23, 2022

(30) Foreign Application Priority Data
Apr. 18, 2019 (DE) .............. 10 2019 110 312.6

(51) Int. Cl.
*G01F 1/684* (2006.01)
*G01F 15/14* (2006.01)

(52) U.S. Cl.
CPC ............ *G01F 1/684* (2013.01); *G01F 15/14* (2013.01)

(58) Field of Classification Search
CPC ................................ G01F 1/684; G01F 15/14
USPC ....................................................... 73/201.22
See application file for complete search history.

(56) References Cited

U.S. PATENT DOCUMENTS 3,566,647 A * 3/1971 Inoue .................. B21D 26/12
29/421.2
3,674,586 A 7/1972 Rimkus
(Continued)

FOREIGN PATENT DOCUMENTS

CN 102472644 A 5/2012
DE 10254720 A1 6/2004
(Continued)

OTHER PUBLICATIONS

Translation of DE-102016121111-B3 (Year: 2018).*
(Continued)

*Primary Examiner* — Nathaniel T Woodward
(74) *Attorney, Agent, or Firm* — Kelly J. Smith; Endress+Hauser (USA) Holding, Inc.

(57) ABSTRACT

A method for producing a probe of a thermal flowmeter for measuring mass flow of a medium in a measuring tube, wherein a probe core is provided arranged loosely in a probe sleeve having a longitudinal axis, wherein the probe sleeve is deformed relative to the longitudinal axis completely radially in the direction of the probe core by means of high energy rate forming, wherein a material-locking connection between probe sleeve and probe core results and a rod is formed, wherein the rod represents a base body that is used (Continued)

for probe production, wherein a deformation speed reaches values greater than 100 m/s, and wherein the high energy rate forming includes explosive forming or magnetic forming.

17 Claims, 8 Drawing Sheets

(56) References Cited

U.S. PATENT DOCUMENTS

| | | | | |
|---|---|---|---|---|
| 5,880,365 | A | * | 3/1999 | Olin ........................ G01F 1/684 73/204.25 |
| 2011/0041597 | A1 | * | 2/2011 | Pfau ........................ G01F 1/684 73/204.25 |
| 2015/0325990 | A1 | | 11/2015 | Madhavan et al. |

FOREIGN PATENT DOCUMENTS

| | | | |
|---|---|---|---|
| DE | 102008002191 A1 | 12/2009 | |
| DE | 102009028850 A1 | 3/2011 | |
| DE | 102016121111 B3 * | 2/2018 | ........... G01F 1/6884 |
| DE | 102016121111 B3 | 2/2018 | |
| DE | 102016121110 A1 | 5/2018 | |

OTHER PUBLICATIONS

Elektromagnetische Umformung, Fraunhofer-Institut Für Werkzeugmaschinen und Umformtecnik IWU, 2016, 8 pp. (Concise Explanation of Relevance provided, 1 p.).

DPMA Office Action issued for DE Patent Application No. 102019110312.6, dated Jan. 14, 2020, 5 pp.

* cited by examiner

METHOD FOR PRODUCING A PROBE OF A THERMAL FLOWMETER, PROBE OF A THERMAL FLOWMETER, AND THERMAL FLOWMETER

CROSS-REFERENCE TO RELATED APPLICATIONS

The present application is related to and claims the priority benefit of German Patent Application No. 10 2019 110 312.6, filed on Apr. 18, 2019, and International Patent Application No. PCT/EP2020/059058, filed on Mar. 31, 2020, the entire contents of which are incorporated herein by reference.

TECHNICAL FIELD

The invention relates to a method for producing a probe of a thermal flowmeter for measuring mass flow of a medium in a measuring tube, to such a probe and to a thermal flowmeter with such a probe.

BACKGROUND

A typical thermal flowmeter includes probes, which protrude into a measuring tube of such flowmeters and during operation are flowed around by a medium. Usually, at least one probe is adapted for registering a media temperature and at least one probe is adapted for heating the medium. For example, a mass flow can be deduced from a heating current required for maintaining a temperature difference between heating probe and temperature registering probe.

In order to be able to rapidly register a temperature change or a flow change of the medium, a low thermal mass of the probe and a good thermal transition between probe and medium are important.

DE102016121110A1 proposes to produce a probe by means of melting silver in a sleeve. In this way, in principle, a good thermal transition between probe and medium can be provided. However, the method is susceptible to the forming of bubbles in the silver melt, such that the probes are frequently not usable. This leads to undesired scrap, which must be found by testing the probes, and causes high costs.

SUMMARY

An object of the invention is, consequently, to provide a better method with less scrap, to provide probes produced by a better method and to provide a thermal flowmeter with such probes.

The object is achieved by a method, by a probe and by a thermal flowmeter as defined in the present disclosure.

In a method of the invention for producing a probe of a thermal flowmeter for measuring mass flow of a medium in a measuring tube, a probe core is provided arranged loosely in a probe sleeve having a longitudinal axis,
wherein, in at least a first method step, the probe sleeve is deformed relative to the longitudinal axis completely radially in the direction of the probe core by means of high energy rate forming, wherein a material-locking connection between probe sleeve and probe core occurs and, thus, a rod is formed,
wherein the rod represents a base body, or wherein a base body is separated from the rod, wherein the base body is applied for probe production,
wherein a radial deformation speed reaches values greater than 100 m/s and, especially, greater than 200 m/s, wherein the high energy rate forming is accomplished especially by means of explosive forming or magnetic forming.

A separation between an outer surface of the probe core and an inner surface of the probe sleeve before application of the high energy rate forming should, in such case, ideally be not more than 0.5 mm, such that a loose fit is present.

Explosive forming is a forming method derived from explosive plating. The probe sleeve is surrounded by an explosive substance, which has a high detonation speed. After ignition of the explosive substance, there occurs upon impact of a sleeve wall on the probe core a material-locking connection and, thus, a mechanically stable connection, whereby also a good thermal transition between probe core and probe sleeve is assured.

Magnetic forming utilizes the phenomenon that time variable magnetic fields induce eddy currents in conductive materials, and the eddy currents for their part bring about a force on the material, which force is directed radially inwards. In the case of strong magnetic fields and fast rates of change, sleeve shaped conductive objects can experience a rapid deformation.

In an embodiment, in an additional method step, the base body is drawn, by means of which a lessening of an outer diameter of the base body and a smoothing of a lateral surface of the base body are obtained.

For example, the base body is drawn through an opening in a tool, which opening has a slightly smaller diameter than the outer diameter of the base body. In this way, a lateral surface of the base body can be smoothed. In this way also, the outer diameter of the base body can be brought to a desired size. A plurality of drawing steps with sequentially smaller openings can be necessary.

In an embodiment, in an additional method step, a first end of the base body is sealed media tightly,
wherein the sealing of the first end includes a removing of probe core in an end region, wherein a probe head is introduced into the vacated end region and secured to the probe sleeve especially by laser welding,
wherein an outside of the probe head has especially a rounded shape, such as, for example, a hemispherical or hemiellipsoidal form.

In an embodiment, in an additional method step, the probe core is sectionally, at least partially, exposed on a side toward a second end of the base body,
wherein a contact area for mounting a thermoelement on the probe core is prepared on the probe core,
wherein the contact area has relative to the longitudinal axis an interior angle, which is less than 30 degrees, and, especially, less than 20 degrees and preferably less than 10 degrees.

The thermoelement can, in such case, be, for example, a PT100 thermoelement.

In an embodiment, in an additional method step, after the mounting of a thermoelement, there is brought to the base body, for example, by means of soldering, adhesive or sintering, a connecting sleeve, which completely covers the previously, at least partially, exposed region, wherein the connecting sleeve is connected media tightly with the probe sleeve, especially with a circumferential laser weld.

In an embodiment, the probe sleeve includes a section of reduced outer diameter in a contact region for connecting with the connecting sleeve, wherein the connecting sleeve is plugged onto the section of reduced outer diameter in an additional method step.

In an embodiment, the probe sleeve is made of a first material comprising a stainless steel, and wherein the probe core is made of a second material, for example, comprising silver or copper,
wherein the second material has a thermal conductivity of at least 100 W/(m*K), and, especially, at least 200 W/(m*K) and preferably at least 300 W/(m*K),
wherein the connecting sleeve is made especially of the first material.

In an embodiment, after high energy rate forming, a diameter of the probe core is less than 5 mm and, especially, less than 4 mm and preferably less than 3 mm and greater than 0.5 mm, and, especially, greater than 1 mm and preferably greater than 1.5 mm, and
wherein the probe sleeve has in a region of unreduced outer diameter an outer diameter, which is at least 0.1 mm and, especially, at least 0.2 mm and preferably at least 0.5 mm greater than, as well as at most 1.5 mm and, especially, at most 1.2 mm and preferably at most 1 mm greater than, the diameter of the probe core.

A probe of the invention made according to a method as claimed in one of the preceding claims for a thermal flowmeter for measuring mass flow of a medium in a measuring tube comprises:
a base body with a probe core and a probe sleeve, which at least sectionally surrounds the probe core and is connected with such by material bonding;
a probe head, which is connected media tightly with the probe sleeve at a first end of the base body and seals the first end;
a thermoelement, which is secured, for example, as a result of soldering, adhesive or sintering, to a contact area of the probe core in an, at least partially, exposed region;
a connecting sleeve, which completely covers the previously, at least partially, exposed region, wherein the connecting sleeve is connected media tightly with the probe sleeve, especially with a circumferential laser weld.

In an embodiment, the probe core includes in the previously, at least partially, exposed region a projection, which protrudes from a base area,
wherein the contact area is arranged on the projection and has relative to the longitudinal axis an interior angle of less than 30 degrees, and, especially, less than 20 degrees and preferably less than 10 degrees.

In an embodiment, the projection includes a rear face connected with the probe sleeve by material bonding, wherein the probe sleeve is adapted in the region of the rear face mechanically to stabilize the projection.

In an embodiment, the thermoelement is adapted to determine a temperature of the medium and/or to heat the medium.

A thermal flowmeter of the invention comprises:
a measuring tube for conveying a medium;
at least one probe as claimed in one of claims 9 to 12, wherein the probe is arranged in the measuring tube;
an electronic measuring/operating circuit for operating the at least one probe and for providing flow measured values.

BRIEF DESCRIPTION OF THE DRAWINGS

The invention will now be described based on examples of embodiments presented in the appended drawing, the figures of which show as follows:
FIGS. 1 a) to d) shows views by way of example of different stages in the production of a probe of the present disclosure;

FIGS. 2 a) to c) shows views of different embodiments of a probe core of the present disclosure having a contact area for attaching a thermoelement.

DETAILED DESCRIPTION

Figure 1:
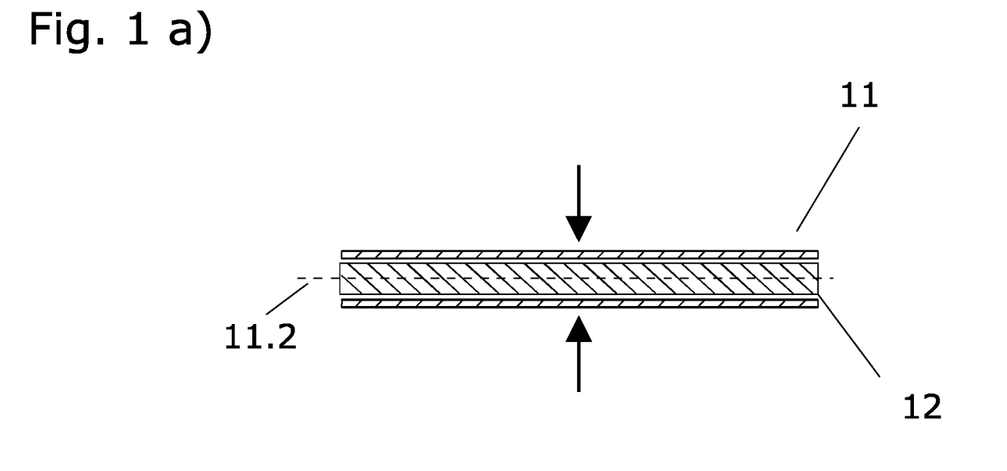

FIG. 1a) shows a section of a probe sleeve 11 having a longitudinal axis 11.2, in which a probe core 12 is loosely arranged. In a first method step for manufacturing a probe of the invention, the probe sleeve is deformed completely radially relative to the longitudinal axis in the direction of the probe core, such that a material-locking connection with the probe core occurs. The deformation is accomplished in such case by means of high energy rate forming, wherein a radial deformation speed reaches values greater than 100 m/s and, especially, greater than 200 m/s. The high energy rate forming can be, for example, explosive forming or magnetic forming. Explosive forming is derived from explosive plating. An explosive substance is placed on an outside of the probe sleeve and ignited. During the impacting of the probe sleeve on the probe core, the high deformation speed leads to an interfacial mixing of a probe sleeve material and a probe core material. In this way, a rod is obtained, composed of the probe core secured in the probe sleeve.

FIG. 1b) shows a section through a base body 14, which is applied for probe production. The base body is produced, in such case, after the high energy rate forming by separating a rod section from a remainder of the rod.

In an additional method step, the base body can be subjected to drawing, by means of which a lessening, or adjusting, of an outer diameter 14.1 of the base body and a smoothing of a lateral surface 14.2 of the base body are obtained. In such case, the base body is drawn through an opening, which has a slightly smaller diameter than the outer diameter of the base body. This step can be repeated a number of times, with, in each case, a smaller opening. The base body has a first end 14.3 and a second end 14.4.

FIG. 1c) shows another phase of the production of a probe of the invention, wherein in an additional method step in an end region 14.31 of the first end a, wherein a probe head 15 is then introduced into the end region, where a part of the probe core was removed, and subsequently secured to the probe sleeve, especially by laser welding. In this way, the first end of the base body is sealed media tightly. An outside 15.1 of the probe head has, for example, such as shown in this case, a rounded shape, such as, for example, a hemispherical or hemiellipsoidal form, this being advantageous for flow resistance of the probe.

Figure 2:
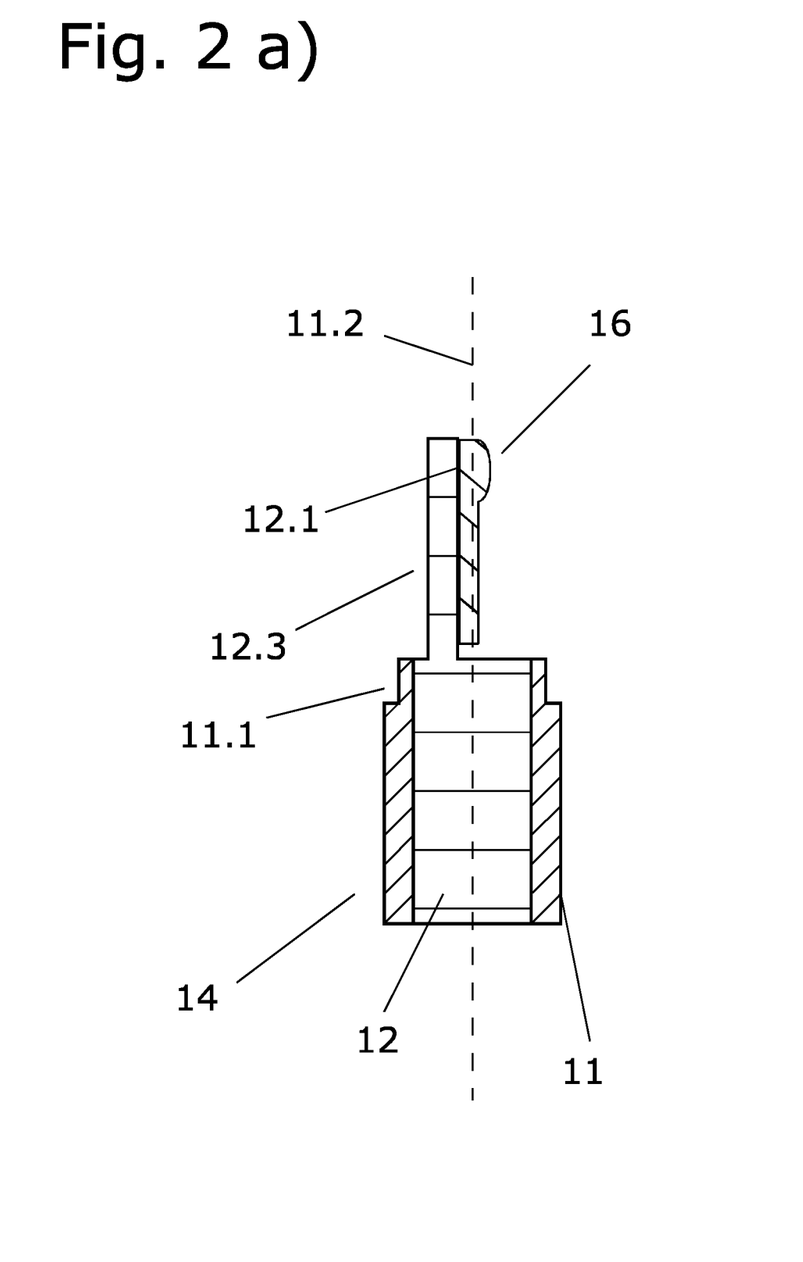

In an additional method step, the probe core is exposed at a second end of the base body and a contact area formed for bringing a thermoelement 16 to the probe core. The contact area can, such as shown in this case, extend in parallel with the longitudinal axis of the probe sleeve. Other views by way of example for the contact area are shown in FIG. 2. The thermoelement 16 is secured, for example, by means of soldering, adhesive or sintering.

Figure 3:
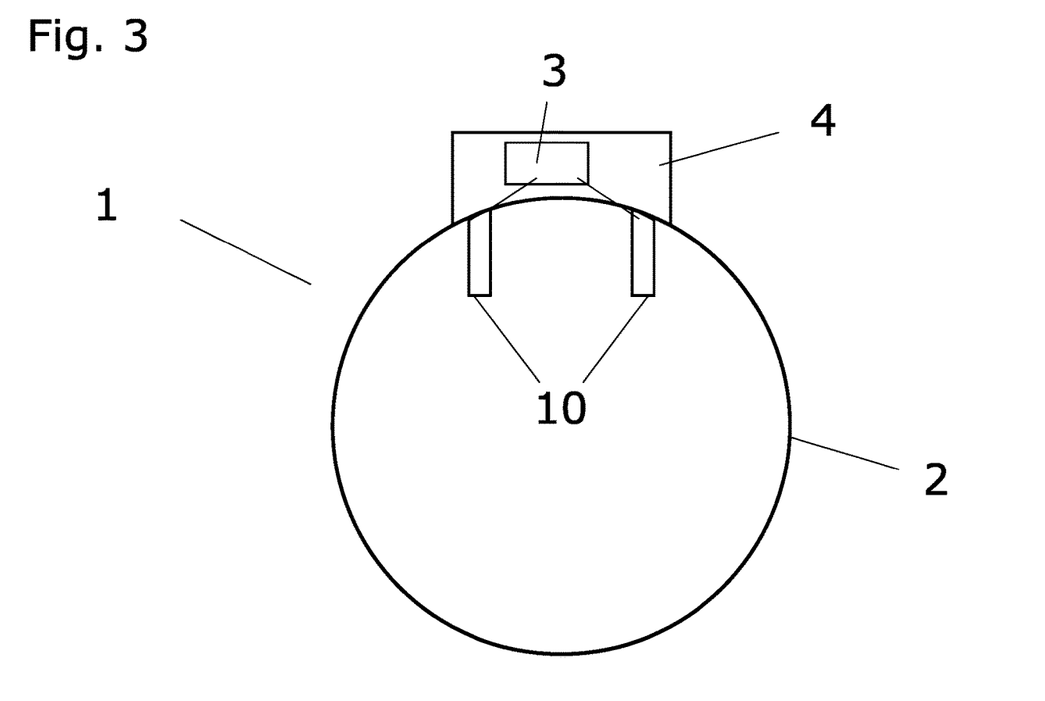
FIG. 3 shows a schematic front view of an example of a thermal flowmeter.

Thermoelement 16 includes, in such case, electrical connection lines 16.1, by means of which the thermoelement is connectable to an electronic measuring/operating circuit 3; see FIG. 3.

Probe sleeve 11 can in a contact region 11.1 be provided with a reduced outer diameter for receiving a connecting sleeve 17, such as shown in this case in FIG. 1d), such that a stop is formed for the connecting sleeve.

The sequence of the method steps described here can be changed.

FIG. 1d) shows an end stage of the production of a probe of the invention, wherein after bringing the thermoelement 16 to the probe core 12 a connecting sleeve 17 is plugged over the exposed region of the base body, such that the previously exposed region is now completely covered. After securing the connecting sleeve, for example, by means of a circumferential laser weld, the connecting sleeve then resides in a state where it is media tightly connected with the probe sleeve.

The probe sleeve 11 shown in FIGS. 1a) to d) is made of a first material comprising a stainless steel, while the probe core 12 is made of a second material, for example, comprising silver or copper, wherein the second material has a thermal conductivity of at least 100 W/(m*K), and, especially, at least 200 W/(m*K) and preferably at least 300 W/(m*K). The connecting sleeve 17 is especially made of the first material.

Since stainless steel has a lower of thermal conductivity than the second material, a temperature change of the probe sleeve, caused, for example, by a change of the media temperature, leads to a uniform, or almost constant, temperature distribution in the sensor core and, thus, in the thermoelement.

FIGS. 2a) to c) show by way of example cross-sections through the base body 14 of the invention, with probe core 12 and probe sleeve 11. In the case of FIGS. 2a) and b), in each case, a projection 12.3 having a contact area is formed from the probe core in an exposed region and a thermoelement 16 is mounted on the contact area. In the case of FIG. 2c), a diameter of the base body is large enough to arrange a thermoelement perpendicularly to the longitudinal axis 11.2 of the probe sleeve. The examples of embodiments illustrated in FIGS. 2a) and b) enable production of probes with small diameter. In this way, a thermal mass of the probe and, thus, a response behavior can be optimized.

FIG. 3 shows, by way of example, a schematic, front view of a thermal flowmeter 1 having a measuring tube 2, two probes 10 of the invention, which are arranged in the lumen of the measuring tube 2, and a housing 4, which has an electronic operating circuit 3. The electronic operating circuit is adapted to operate the probes 10 and to provide flow measured values.

In order to measure the mass flow of a medium through the measuring tube 2, for example, a first probe is heated in the medium flowing through the measuring tube 40 in such a manner that a temperature difference relative to the media temperature remains constant. A second probe can be used, in such case, for temperature measurement of the medium. Assuming that media properties, such as density and composition, remain constant, the mass flow of the medium can be ascertained via the heating current needed for maintaining the temperature. The thermal flowmeter shown here is by way of example and purely for purposes of illustration. Those skilled in the art can bring together any number of probes according to given requirements of an application and arrange these in the measuring tube in desired manner. Methods for operation of such probes are known in the art.

The invention claimed is:

1. A method for producing a probe of a thermal flowmeter for measuring mass flow of a medium in a measuring tube, the method comprising:
   providing a probe core disposed loosely in a probe sleeve having a longitudinal axis; and
   deforming the probe sleeve completely radially relative to the longitudinal axis in the direction of the probe core using high energy rate forming such that a material-locking connection is formed between the probe sleeve and the probe core and a rod is produced,
   wherein the rod defines a base body, or a separated section of the rod defines the base body, from which base body a probe is manufactured,
   wherein a radial deformation speed of the high energy rate forming reaches values greater than 100 m/s, and wherein the high energy rate forming is performed using explosive forming,
   and wherein the explosive forming comprises the steps of placing an explosive substance on an outside surface of the probe sleeve and igniting the explosive substance.

2. The method of claim 1, further comprising drawing the base body such that an outer diameter of the base body is decreased and a lateral surface of the base body is smoothed.

3. The method of claim 1, further comprising sealing a first end of the base body media-tightly, wherein the sealing of the first end comprises:
   removing the probe core in an end region;
   introducing a probe head into the end region; and
   securing the probe head to the probe sleeve by welding, wherein an outer side of the probe head has a rounded shape.

4. The method of claim 3, wherein the probe head has a hemispherical or hemiellipsoidal shape.

5. The method of claim 1, further comprising:
   exposing a region of the probe core, at least partially, a side toward a second end of the base body;
   preparing a contact area on the probe core, wherein the contact area is configured to enable mounting a thermoelement on the probe core, wherein the contact area has an interior angle relative to the longitudinal axis that is less than 30 degrees.

6. The method of claim 5, wherein the interior angle of the contact area is less than 10 degrees.

7. The method of claim 5, further comprising:
   mounting the thermoelement on the contact area;
   affixing a connecting sleeve media-tightly to the probe sleeve of the base body by welding, wherein the connecting sleeve completely covers the at least partially exposed region of the probe core.

8. The method of claim 7, wherein the thermoelement is mounted on the contact area by soldering, adhesive or sintering, and
   wherein the connecting sleeve is affixed to the probe sleeve by a circumferential laser weld.

9. The method of claim 7, wherein the probe sleeve includes a section of reduced outer diameter in a contact region, the section configured to facilitate affixing the probe sleeve with the connecting sleeve, wherein the connecting sleeve is introduced onto the section of reduced outer diameter.

10. The method of claim 1, wherein the probe sleeve is a first material comprising a stainless steel, wherein the probe core is made of a second material having a thermal conductivity of at least 100 W/(m*K), and wherein the connecting sleeve is the first material.

11. The method of claim 1, wherein, after the high energy rate forming, a diameter of the probe core is less than 5 mm and greater than 0.5 mm, and
   wherein, after the high energy rate forming, the probe sleeve has an unreduced outer diameter of at least 0.1 mm greater than, and at most 1.5 mm greater than, the diameter of the probe core.

12. The method of claim 11, wherein, after the high energy rate forming, a diameter of the probe core is less than 3 mm and greater than 1.5 mm, and
wherein, after the high energy rate forming, the probe sleeve has an unreduced outer diameter of at least 0.5 mm greater than, and at most 1 mm, greater than the diameter of the probe core.

13. A probe for a thermal flowmeter for measuring mass flow of a medium in a measuring tube, the probe comprising:
a base body including a probe core and a probe sleeve, which at least sectionally surrounds the probe core and is connected therewith by material bonding;
a probe head, which is connected media-tightly with the probe sleeve at a first end of the base body and seals the first end;
a thermoelement secured to a contact area of the probe core in a previously, at least partially, exposed region, wherein the thermoelement includes electrical connection lines to enable operation of the thermoelement; and
a connecting sleeve, which completely covers the previously, at least partially, exposed region, wherein the connecting sleeve is connected media-tightly with the probe sleeve,
wherein the probe is manufactured according to the method of claim 1.

14. The probe of claim 13, wherein the probe core includes in the previously, at least partially, exposed region a projection, which protrudes from a base area,
wherein the contact area is arranged on the projection and has relative to the longitudinal axis an interior angle of less than 30 degrees.

15. The probe of claim 14, wherein the projection includes a rear face connected to the probe sleeve by material bonding, wherein the probe sleeve is adapted mechanically in a region of the rear face to stabilize the projection.

16. The probe of claim 13, wherein the thermoelement is adapted to determine a temperature of the medium and/or to heat the medium.

17. A thermal flow measuring device, comprising:
a measuring tube adapted to convey a medium;
at least one probe according to claim 13, wherein the at least one probe is arranged in the measuring tube;
an electronic measuring/operating circuit configured to operate the at least one probe and to provide flow measured values; and
a housing adapted to house the electronic measuring/operating circuit.

* * * * *